United States Patent [19]

Papetti

[11] 4,064,116

[45] Dec. 20, 1977

[54] ABS POLYMER AND PROCESS FOR ITS PREPARATION

[75] Inventor: Stelvio Papetti, Leominster, Mass.

[73] Assignee: Foster Grant Co., Inc., Leominster, Mass.

[21] Appl. No.: 575,292

[22] Filed: May 7, 1975

Related U.S. Application Data

[63] Continuation-in-part of Ser. No. 168,422, Aug. 2, 1971.

[51] Int. Cl.² .................. C08F 291/02; C08F 279/02; C08F 279/04
[52] U.S. Cl. ................................ 260/880 R; 526/227
[58] Field of Search .................................... 260/880 R

[56] References Cited

U.S. PATENT DOCUMENTS

| | | | |
|---|---|---|---|
| 3,436,440 | 4/1969 | Abe et al. | 260/880 |
| 3,509,237 | 4/1970 | Aubrey | 260/876 |
| 3,515,692 | 6/1970 | Carrock et al. | 260/33.6 |
| 3,644,587 | 2/1972 | Finberg | 260/880 |
| 3,781,383 | 12/1973 | Finestone et al. | 260/876 |

*Primary Examiner*—William F. Hamrock

[57] ABSTRACT

ABS polymers having improved physical properties are prepared by graft polymerizing, in an aqueous medium, and in the presence of a suspending agent, styrene and acryonitrile onto a butadiene polymer in the form of a latex using certain peroxy ester catalysts.

18 Claims, No Drawings

ABS POLYMER AND PROCESS FOR ITS PREPARATION

RELATED APPLICATION

This application is a continuation-in-part of copending application of Ser. No. 168,422 filed Aug. 2, 1971.

BACKGROUND OF THE INVENTION

This invention relates to ABS-type polymers and more particularly to an improved process for preparing ABS-type polymers having excellent physical properties.

Over the past few years acrylonitrile-butadiene-styrene terpolymer, more commonly known as ABS polymers, have taken over a large share of the market formerly held by other impact polymeric materials such as impact polystyrene. The constantly increasing demand for these polymers is due to the excellent mechanical and chemical properties that they possess; for instance, ABS plastics have greater toughness and impact strength than impact polystyrenes containing the same amounts of rubber and they also possess excellent chemical solvent resistance.

In spite of the excellent mechanical and chemical properties of ABS polymers their growth in the plastics market has been somewhat hindered due to their high cost and poor visual properties. Both of these disadvantages are caused to some extent by the method of commercial production of ABS polymers. Today, by far the greatest amount of ABS polymer on the market is produced by conventional emulsion polymerization techniques. Unfortunately, the prolonged polymerization periods and multi-step post polymerization necessary in emulsion type processes often render products made by this type of process economically unsuitable for many users. In addition, residual emulsifier and other agents still present in the polymer due to incomplete purification cause the polymer to have poor color. For these reasons more efficient and economical processes for producing ABS polymers are constantly being sought.

Recently, a patent has issued to De Bell et al. (U.S. 3,370,105) which discloses a process of preparing rubber-containing impact type polymers such as ABS by the suspension method. The unique feature of this patented process is that the rubbery material onto which the styrene and acrylonitrile are grafted is originally in the form of latex but the latex is coagulated prior to the initiation of the polymerization. Products prepared by this process, although representing an improvement over some prior art products, still leave a lot to be desired from the standpoint of appearance of physical properties.

In another recently issued U.S. Pat. No. 3,436,440, Abe et al disclose an emulsion-suspension process involving the graft polymerization of a mxture of styrene and acrylonitrile onto a butadiene rubbery polymer in latex form. In this process the rubber latex, monomers, a suspending agent, a water-soluble catalyst and an oil-soluble catalyst are all introduced into a reactor; the contents are heated to polymerization temperature and the reaction proceeds in the emulsion state. After the polymerization has proceeded to a certain point the emulsion coagulates and forms a stable suspension. The polymerization is then completed in suspension. The product prepared by this process has very good mechanical properties, however, it may have an undesirable color. This patent also discloses a process in which an oil-soluble catalyst is used alone to produce ABS polymers. Products prepared according to this disclosure have very poor physical properties.

A process has now been discovered for producing ABS polymers having excellent mechanical and visual properties. This process also presents the desirable feature of having a very short polymerization cycle, such as in the range of 4–7 hours, thus the efficiency of the process of the invention is greater than that of comparable prior art processes. Accordingly, it is an object of the invention to present a process for preparing ABS polymers having improved physical properties. It is a second object of the invention to present a short time-cycle process for preparing ABS-type polymers. These and other objects of the invention will become apparent as the description proceeds.

SUMMARY OF THE INVENTION

According to the present invention a monovinyl aromatic monomer and nitrile monomer are graft copolymerized onto a rubbery polymer in latex form in an aqueous medium with the aid of a suspending agent and a peroxy ester catalyst having the formula:

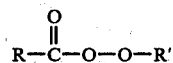

where R is a hydrocarbon radical containing up to 8 carbon atoms, and R' is a tertiary alkyl hydrocarbon radical containing up to 8 carbon atoms. The catalyst is used in a concentration of about 0.05–20.8%, based on the total weight of monomer in the reaction mixture.

DESCRIPTION OF THE INVENTION

The term monovinyl aromatic monomer has its usual meaning and includes those polymerizable compounds containing an aromatic nucleus attached to an aliphatic hydrocarbon radical which contains a vinyl group. Typical members of this class are styrene, alphamethylstyrene and vinyl toluene. The expression nitrile monomer is used in the present instance to define the group consisting of acrylonitrile and methacrylonitrile.

According to the preferred mode of operation the polymerization reaction mixture is prepared by combining, in a suitable reaction vessel equipped with an agitator, water, the rubbery latex, the monovinyl aromatic monomer and nitrile monomer, one or more of the above described catalysts, suitable suspending agents, and any other additives that it may be desired to include at this time. Agitation is commenced and the reaction mixture is heated to a temperature suitable for polymerization. Generally the polymerization is carried out at a temperature of about 40° to about 130° C. although lower or higher temperatures may be employed if desired. After the initial polymerization phase, in which the latex is in the emulsion state, the reaction mixture converts to a stable suspension. The reaction then proceeds with the polymeric particles and unreacted monomer being stably suspended as beads in the aqueous medium. When the desired degree of polymerization is reached, the reaction mixture is cooled down and the polymeric product in bead form is separated from the aqueous medium, washed and dried. If any unreacted monomer remains in the reaction mixture it may be stripped off prior to the cooling step.

It may be desirable to conduct the polymerization in a closed system to prevent the escape into the atmosphere of nitrile monomer or other volatile components of the reaction mixture. This is especially important when the polymerization is to be conducted at temperatures above about 70° C. Additionally, it may be desired to conduct the reaction under an inert atmosphere, in which case nitrogen or some other inert gas may be introduced into the vapor space above the reaction mixture. Similarly, it may be desirable to polymerize the reactants at temperatures above the normal (at atmospheric pressure) boiling point of the aqueous medium. In this case the reaction is conducted at superatmospheric pressures and the pressure may be the autogeneous pressure or super autogeneous pressures obtained by means of an inert gas. When the polymerization reaction is to be carried out at elevated temperatures, a catalyst having a suitable two hour half-life temperature is selected.

In an alternative embodiment of the process it may be desirable to carry out the polymerization in two stages. In the first stage the reaction is conducted at a low temperature for example at about 40° C. to about 90° C.. At the completion of the first stage, which will be at some period after the system converts to the suspension state, the temperature of the reaction medium is raised to about 70° to 130° C. and maintained in this range until the polymerization is completed. The advantage of a two stage process over a single stage process is that there is less residual monomer remaining in the final product. When the two stage process is employed, the catalyst system may be comprised of a single catalyst which may all be added initially or in two or more increments, the first increment being before the polymerization and the subsequent increments being added at selected times during the polymerization. A combination of catalyst may also be used in the two stage process, a first stage or low temperature catalyst having a relatively low two hour life-long temperature, for example about 40° C. to 100° C. and a second stage or high temperature catalyst having a two hour half-life temperature in the range of about 80° to 130° C.. The second stage catalyst may be added initially with the first stage catalyst or at the completion of the first stage of polymerization.

The rubbery polymer which provides the background onto which the monomers are grafted can be butadiene polymer. For instance, it may be butadiene homopolymer or a copolymer of butadiene and another vinyl material. The preferred rubbery polymers are polybutadiene, butadiene-styrene copolymer and butadiene-acrylonitrile copolymer. Mixtures of the above rubbery polymers are also contemplated in the invention. The rubbery polymer used in the invention is in the latex form. It may be prepared by any desired method and its preparation does not constitute any part of the present invention.

The amount of rubbery polymer added to the reaction mixture is not critical and may vary from about 3% up to about 60% or more, these percentages being based on the total amount of polymer in the product. When the amount of rubbery polymer in the composition drops below about 3% the improvement of the mechanical properties over the same mechanical properties of a styrene-acrylonitrile compolymer becomes insignificant, so it is not worth while preparing ABS polymers containing amounts of rubber substantially less than 3% by weight. On the other hand, the maximum concentration of rubber may be as high as, or even higher than 60%. ABS polymers containing rubbery contents in this neighborhood are very valuable for blending with styrene-acrylonitrile copolymer to form ABS polymers having lower rubber contents. This represents an improvement over the prior art processes in that it was formerly quite difficult to prepare high rubber content ABS polymers by conventional prior art techniques.

The preferred principal monomers used in the invention are styrene and acrylonitrile. The amount of monomer added to the reaction mixture is not critical and may in general vary such that the final product contains about 97-40% resinous polymer. The term resinous polymer is used herein to describe the non-rubbery polymeric components in the product, the principal ones being styrene and acrylonitrile. The relevant amount of styrene and acrylonitrile is not critical and the amount of acrylonitrile preferably varies between about 10 and 40%, based on the total amount of monomer in the reaction mixture. It is convenient to use the azeotropic combination of styrene and acrylonitrile, that is about 24 parts of acrylonitrile per each 76 parts of styrene.

Other monomeric or polymeric components may be present in the reaction mixture, provided that their presence does not adversely affect the polymerization or the properties of the finished product. For example, vinyl monomers such as vinyl chloride, acrylic esters and vinyl aromatic monomers may be added in small amounts to the polymerization mixture without materially affecting the properties of the polymer. In addition, a portion of the styrene may be replaced by alphamethylstyrene where it is desired to produce a polymer having a high heat distortion temperature. Similarly, other monomeric materials may be added to change the color or improve the transparency of the polymer. Thus chlorostyrene may be added to the monomeric mixture.

The catalysts which have been found to produce the superior results of the inventon are those having the formula:

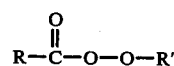

These compounds are generally known as peroxy esters or simply peresters. R, in the above formula, represents a hydrocarbon radical preferably containing up to about 8 carbon atoms. It has been found that the greater the number of carbon atoms present in this chain the more sluggish the performance of the catalyst. In general the best performance is obtained when R is an alkyl group and contains one to about 8 carbon atoms. In a preferred embodiment R is a tertiary alkyl compound, and particularly good results are obtained when R is the tertiarybutyl radical.

R', in the above catalyst formulation, represents a tertiary alkyl radical preferably containing up to about 8 carbon atoms. In a preferred embodiment of the invention at least one of the groups attached to the tertiary carbon atoms is the methyl group and particularly good results have been obtained when all of the alkyl groups attached to the tertiary carbon atoms are methyl groups, that is, when R' is the tertiary butyl radical. Examples of preferred catalysts used in the process of the invention are t-butyl peroxy isobutyrate, t-biutyl peroxy pivalate and t-butyl peroxy octoate and mixtures of these.

The principal catalysts of the invention may be prepared by any desired method. For example, they can be conveniently prepared by reacting hydroperoxides with organic acid chlorides or organic acid anhydrides. The preparation of these catalysts forms no part of the present invention.

The amount of catalyst used in the processes of the invention may vary from about 0.05% to about 0.8% based on the total weight of monomer present. In the preferred embodiment the catalyst concentation may vary from about 0.1 to 0.3%, based on the total weight of the monomer.

The above class of organic peroxide catalyst have been found to function exceptionally well in the invention. The preferred members of this class of catalyst all have two hour half-life temperatures between about 50°–100° C.. Other members of this group whic have two hour half-life temperatures substantially above 100° C., such as t-butyl perbenzoate, which has a two hour half-life temperature of about 117° C., can also be satisfactorily used in the invention; however, processes involving the use of these catalysts may require the modification of the reactor and auxiliary apparatus to accommodate the superatmospheric pressures developed at temperatures considerably above about 100° C.. Organic peroxides other than those of the above class and non peroxide catalysts have been tried in the process of the invention but they have been found to be unsatisfactory when used without the presence of one of the above catalysts as the principal catalytic agent.

The suspending agent is added to the polymerization reaction mixture to facilitate the establishment of a stable suspension when the coagulation of the emulsion occurs. The particular suspending agent used is a matter of choice and those which give the best results in a given system can be easily determined with a minimum of experimentation. Polyvinyl alcohol has been found to produce a stable suspension in the process of the invention.

The suspending agent may be added prior to polymerization or at the time of emulsion breakdown. The amount of suspending agent is not critical and one skilled in the art can easily determine by experimentation the optimum amounts necessary to establish a stable suspension for any given polymerization system.

It is sometimes desirable to produce a polymer with a molecular weight in a specific range or with a high degree of grafting. This can be accomplished by adding small amounts of chain regulating agents such as mercaptans to the polymerization mixture, either prior to, or during the polymerization. Typical chain transfer agents which can be used as dodecyl mercaptan and alpha-methylstyrene dimers. Other additives may be incorporated into the polymerization formulation to modify the properties of the product. Thus, anti-oxidants may be added to prevent oxidation and resulting coloration of the polymer. Similarly, dyeing agents may be added to the reaction mixture prior to or during the polymerization reaction.

The invention will now be further illustrated in the following specific examples in which parts and percentages are on a weight basis.

EXAMPLE I

A five liter glass reactor equipped with a mechanical agitator and a thermometer is charged with the following formulation:

|  | Parts |
| --- | --- |
| Water | 3730 |
| Polybutadiene latex | 281 |
| Styrene | 571 |
| Acrylonitrile | 234 |
| Polyvinyl alcohol | 17.5 |
| t-butyl peroctoate | 2.5 |
| t-dodecyl mercaptan | 2.7 |
| Anti-oxidant | 4.8 |

Agitation is commenced and the temperature is raised to 87° C. and maintained there for 5 hours. The polymerization reaction proceeds for 1 hour and 45 minutes, before it coagulates and converts to a stable suspension. It remains in this state until the polymerization is completed.

The reaction mixture is cooled and the polymeric product in bead form is recovered, washed and dried. The dried beads are extruded and pelletized and the pellets are injection molded into physical test specimens. Physical tests are conducted on the specimens and the results are tabulated in Table I.

EXAMPLE II

A thermoplastic polymer is prepared according to the procedure of Example I except that 2.5 parts of t-butyl peroxy isobutyrate is used instead of the t-butyl peroctoate and the polymerization is conducted for 5 hours at 75° C.. The polymerization reaction proceeds for two hours and a half before it coagulates and converts to a stable suspension. It remains in this state until the polymerization is completed. Physical test specimens are molded and tested and the results are tabulated in Table I.

EXAMPLE III

A thermoplastic polymer is prepared according to the procedure of Example I except that 2.5 parts of t-butyl peroxy pivalate is used instead of the t-butyl peroctoate and the polymerization is conducted for 5 hours at 68° C.. The polymerization reaction proceeds for three hours before it coagulates and converts to a stable suspension. It remains in this state until the polymerization is completed. Physical test specimens are molded and tested and the results are tabulated in Table I.

EXAMPLE IV

A five liter glass reactor, equipped with a mechanical agitator and thermometer, is charged with the following formulation:

|  | Parts |
| --- | --- |
| Water | 3135 |
| Polybutadiene latex | 408 |
| Polyvinyl alcohol | 10.8 |
| Styrene | 796 |
| Acrylonitrile | 342 |
| t-butyl peroxy pivalate | 2.62 |
| high temperature catalyst | 0.8 |
| t-dodecyl mercaptan | 4.0 |

The reactants are polymerized with continuous agitation at 68° C. for 4 hours and then at 100° C. for 1 hour. The polymerization reaction proceeds for 2 hours and 45 minutes before it coagulates and converts to a stable suspension. It remains in this state until the end of the polymerization.

After the polymerization is completed, the reaction mixture is cooled and the polymeric product, in the form of beads, is recovered, washed and dried. The dried beads are then extruded and pelletized and the pellets are injection molded into physical test specimens. The physical properties of the material are tabulated in Table I.

COMPARATIVE EXAMPLE A

The procedure of Example I is repeated except that 0.5% of benzoyl peroxide is substituted for the t-butyl peroctoate. The reaction mixture remains unchanged. The rate of conversion of monomer is very low and the product could not be tested.

TABLE I

| Ex. | Izod Impact Strength ft. lbs/in | Vicat °C | Tensile Strength at Yield psi | Color | Gel Content |
|---|---|---|---|---|---|
| I | 5.4 | 103.7 | 4700 | Very good | Low |
| II | 4.8 | 107.0 | 4700 | Very good | Low |
| III | 6.6 | 103.0 | 5000 | Very good | Low |
| IV | 7.9 | 108.4 | 6100 | Very good | Low |

The Izod impact strength was determined on notched samples in accordance with ASTM D256-70 and is reported in ft. lbs of notch. The tensile strength at yield is determined according to the procedure of ASTM D638-68 and it is reported in psi. The vicat was determined in accordance with the procedure of ASTM D1525-70 and it is reported in °C.

Examples 1-4 illustrate the preferred embodiment of the invention. Comparative Example A illustrates that catalysts other than those which are described as being suitable will not produce satisfactory results in the process of the invention.

All the samples made in accordance with the present invention had good Izod impact strengths. The Example 4 sample, in which a two component catalyst system was used, had exceptionally good impact strength. The tensile strengths of Examples 1-4, which is directed to the present invention, are all very good. As earlier noted, it is very difficult to produce ABS polymers having good white color by coventional polymerization techniques. The product obtained in Example 1-4 had an excellent white color. The strips produced from the Example 1-4 material had very few gels. The product obtained in Comparative Example A contained very little resinous polymer and could not be physically tested.

COMPARATIVE EXAMPLE B

A five liter glass reactor, equipped with mechanical agitator, thermometer, pressure gauge, nitrogen inlet tube and pressure release valve, was charged with 1472 parts of water, 352 parts of the same polybutadiene latex used in Example I of this application, 128 parts of 2.5% polyvinyl alcohol solution and 767 parts of styrene. Then 18.4 parts of benzoyl peroxide and 3.2 parts of t-dodecyl mercaptan were dissolved in 25 parts of styrene, 4.6 parts of anti-oxidant were dissolved in 248 parts of acrylonitrile and added to the reaction mixture. The reaction mixture was heated at 75° C, and 1200 parts water was added after two hours and fifteen minutes, when polymer particles started to coalesce, so free flow of the particles could be re-established. The reaction was continued for about four hours. The beads produced were washed and dried in a forced air oven and in a vacuum oven at 20° C, pelletized and specimens made for testing. The material had very poor color and noticeable odor.

The physical properties of the material:
Izod impact (ft.lbs/in):2.3
Vicat (°C):104.8
Tensile stress at yield (psi):3600.
Shear stress at 868 sec 1 (psi):29.7

COMPARATIVE EXAMPLE C

The procedure of Comparative Example B was substantiallly repeated except that lauroyl peroxide was employed in place of benzoyl peroxide. After 1 hour and 5 minutes of heating, the reaction mixture formed a rubbery state indicating very little polymerization of the styrene-acrylonitrile portion.

Although the invention has been described with particular reference to specific examples it is understood that the scope of the invention is not limited thereto and that variations not inconsistent with the disclosure are contemplated. For instance, it is contemplated that catalysts containing aromatic nuclei or multiple peroxide linkages, such as compounds containing difunctional acids, each functional group of which is etherified by an alcohol, or difunctional alcohols, each functional group of which is etherified by a carboxylic acid, may be used in the invention. An example of one of these compounds is di(tertiarybutyl peroxy) maleate. The scope of the invention is limited only by the breadth of the appended claims.

I claim:

1. A method for graft polymerizing a mixture containing monovinyl aromatic monomer and a nitrile monomer which is acrylonitrile or methacrylonitrile onto a rubbery polymer in the form of a latex, said rubbery polymer being selected from the group consisting of polybutadiene, butadiene-styrene copolymer, butadiene acrylonitrile copolymer or mixtures thereof, said method consisting essentially of effecting the polymerization in an aqueous medium in the presence of an effective suspending agent, and, as the essential catalytic agent, about 0.05-0.8%, based on the total weight of monomer present, of at least one compound having the formula:

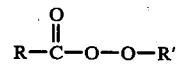

wherein R is an alkyl radical having 1-8 carbon atoms and R' is a tertiary alkyl group containing up to 8 carbon atoms.

2. A process according to claim 1 wherein said catalytic acid agent is present in an amount of about 0.1 to 0.3%, based on the total weight of monomer.

3. A process according to claim 1 wherein said rubbery polymer is polybutadiene.

4. A process according to claim 1 wherein said polymerization reaction is conducted in an inert atmosphere.

5. A process according to claim 1 wherein said polymerization reaction is carried out at a pressure of about 14-50 lbs. psig.

6. A process according to claim 1 wherein R' is a tertiary butyl radical.

7. A process according to claim 6 wherein R' is the t-butyl radical and R is a tertiary alkyl compound.

8. A process according to claim 7 wherein R is a tertiary butyl group.

9. A process, according to claim 1, for preparing improved ABS polymers consisting essentially of graft copolymerizing, onto a polybutadiene backbone in a latex form, a monomeric material comprised of styrene and acrylonitrile, said process being conducted in an aqueous medium in the presence of an effective suspending agent which is polyvinyl alcohol and which is present in an amount of about 0.2-0.5%, based on the weight of water present in the reaction mixture and 0.1-0.3%, based on the weight of the monomer, of a catalyst selected from the group consisting of tertiary butyl peroxy isobutyrate, tertiary butyl peroxy octoate, tertiary butyl peroxy pivalate, and mixtures of these.

10. The process of claim 9 wherein the polymerization is conducted in two steps consisting essentially of a first stage polymerization conducted at about 40°-90° C in the presence of a catalyst having a 2 hour half-life temperature of about 40°-100° C, and a second stage conducted at about 70°-130° C in the presence of a high temperature catalyst having a 2 hour half-life temperature of about 80°-130° C.

11. A method of making an ABS type polymer which consists essentially of:
1. adding to an aqueous medium contained in a closed reaction vessel, (a) a rubbery polymer which is in latex form and which is polybutadiene, butadiene-styrene copolymer, butadiene-acrylonitrile copolymer and mixtures thereof, (b) styrene, (c) acrylonitrile, (d) a suspending agent, (e) about 0.05 - 0.8%, of at least one catalyst having the formula:

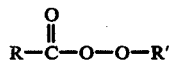

wherein R is an alkyl group having 1-8 carbon atoms and R' is a tertiary alkyl group having up to 8 carbon atoms;
2. polymerizing the contents of said reaction vessel at a temperature of about 50°-150° C, with continuous agitation.

12. The process of claim 11 wherein said suspending agent is polyvinyl alcohol and is present in an amount of about 0.2-0.5%, based on the weight of water present in the reaction mixture.

13. A process according to claim 11 wherein said catalyst is a member of the group consisting of tertiary butyl peroxy isobutyrate, tertiary butyl peroxy octoate, tertiary butyl peroxy pivalate and mixtures of these and wherein said catalyst is present in an amount of about 0.1-0.3%, based on the total weight of monomer.

14. A process, according to claim 11, for preparing an ABS polymer consisting essentially of:
1. adding to an aqueous medium contained in a closed reaction vessel:
a. about 3 to 60 parts of polybutadiene in latex form;
b. about 97 to 40 parts of a mixture comprised of about 20 to 40 parts of acrylonitrile and 80 to 60 parts of styrene;
c. 0.2-0.5%, based on the total weight of water in said reaction mixture, of a suspending agent;
d. 0.05 to 0.5% of a catalyst having a 2 hour half-life temperature of about 50° to 100° C and having the formula:

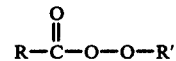

wherein R is an alkyl group containing 1-8 carbon atoms and R' is a tertiary alkyl group containing up to 8 carbon atoms;
2. heating the contents of said reaction vessel to about 50° to 100° C, and maintaining it in this range for about 4-8 hours; and
3. recovering product from the reaction vessel.

15. A process according to claim 14 wherein a portion of the catalyst is added initially and the remainder is added in one or more increments during the polymerization.

16. A method for marking ABS type polymers by polymerizing an aqueous reaction medium consisting essentially of a monovinyl aromatic monomer, acrylonitrile, or methacrylonitrile, a rubbery polymer which is employed in latex form and which is polybutadiene, butadiene-styrene copolymer, or butadiene-acrylonitrile compolymer or mixtures thereof, an effective suspending agent, and about 0.05-0.8%, based on the total weight of the monomer present, of a catalyst of the formula:

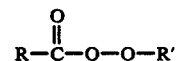

wherein R is an alkyl radical of 1-8 carbon atoms and R' is a tertiary alkyl group of up to about 8 carbon atoms.

17. The process of claim 16 wherein the monovinyl aromatic polymer is styrene, the rubbery polymer is polybutadiene, and the catalyst is a member of the group consisting of tertiary butyl peroxy isobutyrate, tertiary butyl peroxy octoate, tertiary butyl peroxy pivalate or mixtures of these.

18. The process of claim 16 wherein the polymerization is conducted in two stages consisting essentially of a first stage polymerization conducted at about 40°-90° C in the presence of a catalyst having a 2 hour half-life temperature of about 40°-100° C, and a second stage conducted at about 70°-130° C in the presence of a high temperature catalyst having a 2 hour half-life temperature of about 80°-130° C.

* * * * *